UNITED STATES PATENT OFFICE.

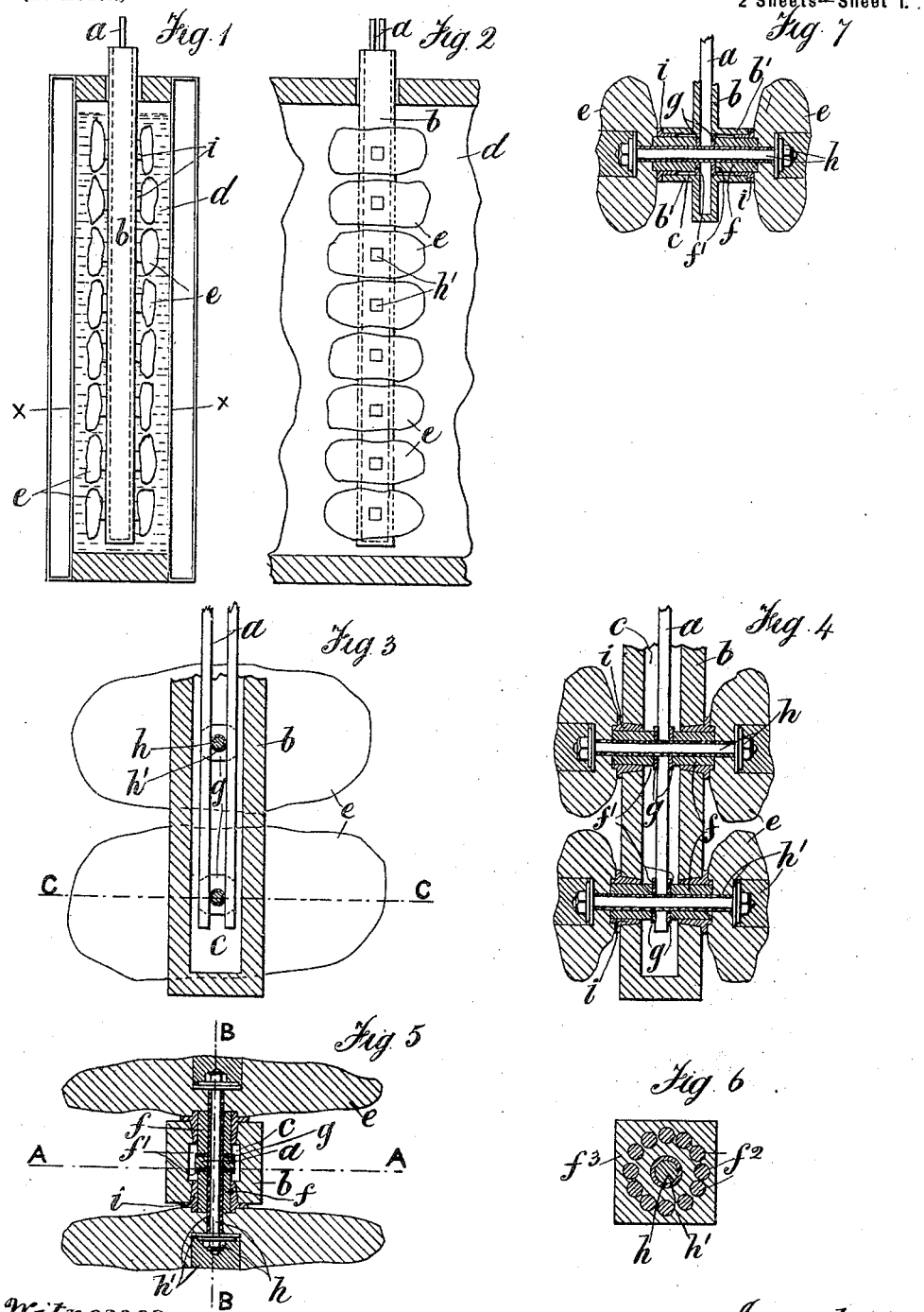

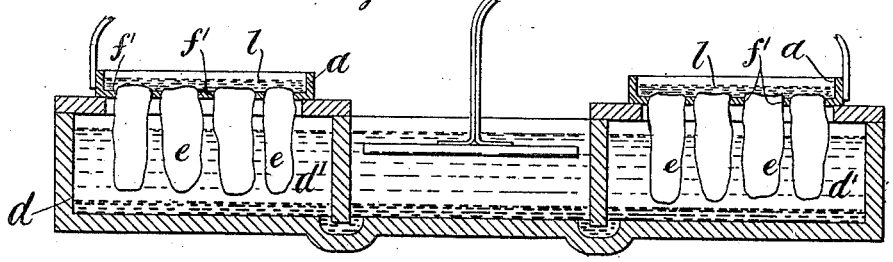
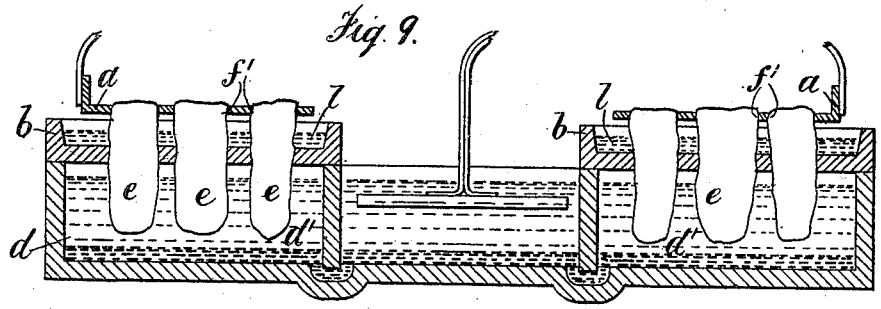
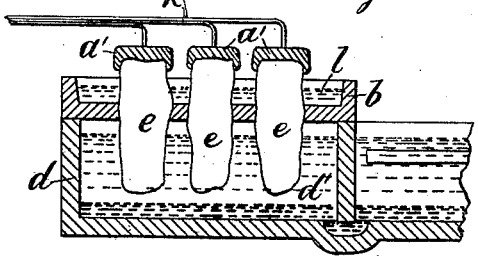

LUKE HARGREAVES AND WILLIAM STUBBS, OF FARNWORTH IN WIDNES, ENGLAND.

ELECTRICAL CONDUCTOR AND ANODE.

SPECIFICATION forming part of Letters Patent No. 689,877, dated December 31, 1901.

Application filed June 17, 1899. Serial No. 720,891. (No model.)

*To all whom it may concern:*

Be it known that we, LUKE HARGREAVES and WILLIAM STUBBS, subjects of the Queen of Great Britain, residing at Farnworth in Widnes, in the county of Lancaster, England, have invented new and useful Improvements in or Connected with Electrical Conductors and Anodes for Electrolytic and Similar Purposes, of which the following is a full, clear, and exact description, reference being had to the accompanying drawings, in which—

Figures 1 and 2 are vertical sections, partly in elevation at right angles to each other, of apparatus or appliances according to our invention as applied to a vertical electrolytic cell. Fig. 3 is a vertical section on the line A A on Fig. 5, Fig. 4 is a vertical section on the line B B on Fig. 5, and Fig. 5 is a horizontal section at c c on Fig. 3, all to an enlarged scale, of a portion of a conductor, casing, anodes, and connections. Fig. 6 is a detail view of a modification of a carbon contact-block. Fig. 7 is a sectional view of a modified construction of appliance for vertical cells. Fig. 8 is a longitudinal sectional view illustrative of our invention as applied to horizontal electrolytic cells. Fig. 9 is a longitudinal sectional view of another modification for horizontal cells. Fig. 10 is a sectional view of a further modification for horizontal cells.

The object of this invention is to provide means whereby metallic or other electrical conductors and the junction of such conductors with the anodes of carbon or other material or with their connections may be protected against any action of the current or of the electrolyte which would tend to disintegrate or destroy such conductor or destroy electrical contact at the junction of the anodes or their connections with the conductor and to provide simple means for attaching anodes to conductors or making contact therewith, so that such anodes can be easily removed and replaced when worn. For these purposes we interpose between the conductor and the electrolyte oil or liquid which is not miscible with the electrolyte or material saturated with such oil or liquid in such manner that such oil or liquid prevents access of the electrolyte, either by capillary attraction or otherwise, along the anodes or connections or through the covering of the conductor to such conductor or to the junction of the anodes or connections with such conductor. In electrolytic cells which are worked at higher than atmospheric temperature the oil or liquid is preferably one which is semisolid or non-flowing at ordinary temperature, but which becomes fluid at the normal working temperature of the electrolytic cell. We have found that resin-oil having dissolved therein a proportion of resin gives good results in connection with anodes used in electrolyzing brine, as it becomes nearly solid when cold, so that the anodes and connections may be carried about or stored without liability to loss of oil. We preferably use the oil or liquid in a casing or receptable at such a head or pressure that such oil or liquid tends to diffuse along the anodes or connections or through any cracks or pores in the casing or receptacle toward the electrolyte, thereby counterbalancing the hydrostatic head or pressure of the electrolyte or the capillary attraction of the anodes or their connections and preventing such electrolyte reaching the conductor or junction of the anodes or their connections with the conductor. By this arrangement also any leakage through the casing can readily be detected by means of a gage or other means of indicating head or pressure, and if such leakage is in consequence of the porosity of the casing or minute crevices therein we may add to the oil or liquid plumbago or other suitable powdery material which will be carried into the pores or crevices and fill them up. It is advisable that the specific gravity of the oil or liquid be as near as possible to that of the electrolyte, because by this means when the casing is immersed in the electrolyte the tendency of such electrolyte to leak into the casing at the bottom is counterbalanced without having such an excess of head of oil as would unduly tend to force the oil out of the casing at the top.

In some cases we may use the oil or liquid without any head or pressure, the superior capillarity or diffusive power of the oil or liquid being sufficient to prevent access of the electrolyte to the conductor or to the junctions of the anodes or their connections with such conductor or to displace the electrolyte from such anodes or connections.

We make contact between the conductor, whether metallic or otherwise, and the anodes by means of blocks of carbon or material not affected by the electrolyte. The said blocks pass through the casing surrounding the conductor and are pressed against the conductor by bolts and nuts or equivalent devices. The anodes are secured to the said blocks by bolts or otherwise, as desired. The blocks may form part of the anodes, if desired. The securing-bolts are made of non-conducting material, or if such bolts are metallic they are insulated by any convenient means, so that they do not act as bearers of current or are not exposed to the action of the electrolyte.

Referring to Figs. 1, 2, 3, 4, and 5, $a$ is a metallic conductor formed in two parallel pieces and connected in any suitable way to one terminal of a dynamo or other source of electricity. $b$ is a casing or receptacle made of non-conducting material, preferably Portland cement, which surrounds the conductor. $c$ is a space between the conductor and the casing, which space is filled with oil or other liquid or solution not miscible with the electrolyte contained in the cell $d$. The level of this oil or liquid is kept so much above that of the electrolyte that the hydrostatic pressure of such electrolyte and its tendency to diffuse through the casing $b$, carbon anodes $e$, and carbon blocks $f$ is counterbalanced by that of the oil, such electrolyte being thereby prevented from reaching the conductor $a$ or the junction of the blocks $f$ at $f'$ with the conductor. The diffusion of the oil through the blocks $f$ does not impair the conductivity of such blocks. The carbon blocks may, if desired, be saturated with oil before being placed in position. By employing a float or the like in the oil any variation in the level thereof caused by leakage through the casing or otherwise can readily be detected. If it is desired to close the casing at the top, pressure may be put on the oil by any desired means and a gage may be used for indicating such pressure. $e$ represents anodes of carbon or other suitable material in contact with the electrolyte. These anodes are connected to the conductor $a$ by blocks of carbon $f$. The blocks $f$ rest at one end against the anodes and at the other end against the conductor $a$ or against washers $g$, attached to such conductor. The washers $g$ are preferably of soft metal, so that the blocks $f$ may closely bed therein. $h$ represents bolts and nuts by means of which the anodes are pressed closely against the blocks $f$ and the blocks $f$ against the conductor or the washers $g$, so that good electrical connection is made from the conductor to the anodes. The blocks $f$ are cemented into the casing $b$ by cement $i$. The bolts and nuts $h$ are covered by insulating material $h'$ to protect them from the action of the electrolyte and also prevent them from acting as bearers of electric current, which would tend to corrode them. The bolts and nuts may be made of non-conducting material, if desired, and in such case will not need insulating. Also, if desired, separate bolts might be used for attaching the anodes to the blocks $f$ and the blocks to the conductor. The blocks $f$ may, as shown in Fig. 6, be formed of a number of pencils of carbon $f^2$ embedded in cement $f^3$. $x$ represents the cathodes connected to the other terminal of the dynamo.

Referring to Fig. 7, in this modification no oil is used around the conductor $a$, but such conductor is incased in impermeable material, such as vulcanite $b$, which prevents access of electrolyte to such conductor. $f$ represents the carbon blocks making contact with the anodes $e$ and washers $g$ on the conductor $a$. The casing $b$ is extended at intervals, as at $b'$, so as to surround each carbon block $f$ and form separate spaces or receptacles $c$, into which oil is placed. $i$ is cement or other convenient material for retaining the oil in the spaces $c$. The blocks $f$ become saturated with the oil, and access of the electrolyte to the junctions $f'$ of the blocks $f$ and washers $g$ is prevented. In this modification the oil is used practically without any pressure.

Referring to Fig. 8, which shows a modification of our invention as applied in connection with anodes for use in horizontal electrolytic cells, $d$ is the electrolytic cell of any convenient or well-known type. $e$ represents the carbon anodes affixed to the metallic conductors $a$ by casting the conductors in the form of dished plates around the tops of the anodes or otherwise attached as desired. The conductors when cast are preferably of lead and form casings or trays which contain oil $l$. The pressure of the oil downward prevents the rising of the electrolyte $d'$ up the carbon anodes by capillary attraction, thereby preventing such electrolyte reaching the junctions $f'$ between the carbon anodes and the conductors $a$. The conductor-plates are supported on the tops of the cell-covers, as shown.

Referring to Fig. 9, in this modification the oil is used without any head or pressure as regards the junctions of the anodes and conductors. $d$ is the electrolytic cell. $b$ represents trays or casings of non-conducting material which contain oil $l$ and which form the covers to the cells. $a$ represents the conductors cast around the tops of the carbon anodes $e$ and above the surface of the oil $l$. The anodes pass through the bottoms of the casings $b$ and are immersed in the electrolyte $d'$, as shown. The oil by its superior diffusive power or capillarity ascends the anodes to the conductors $a$ and prevents the electrolyte $d'$ ascending the anodes or reaching the junctions $f'$ of such anodes with the conductors.

Referring to Fig. 10, this shows another method of attaching the conductors to the anodes. Here each anode $e$ has a separate conductor-cap $a'$ cast on it, such caps being connected by wires $k$ to the source of electricity. The action of the oil in this modification is the same as described under Fig. 9.

We do not confine ourselves to the particular details described, as it will be obvious that various modifications may be made without departing from the nature of our invention; but

What we claim is—

1. An electrolytic cell having an electrode, a conductor of different material connected thereto, a casing or receptacle surrounding their juncture, and a fluid protective substance in the receptacle; substantially as described.

2. An electrolytic cell having an electrode and a conductor of different materials joined together, and a casing or receptacle surrounding their juncture and containing a fluid protective substance; substantially as described.

3. An anode connected to a conductor by blocks of carbon, and a casing surrounding the conductor and through which the blocks extend, and arranged to contain a protective liquid; substantially as described.

4. An electrolytic cell, having an electrode connected to a conductor of different material therefrom, and a casing surrounding the juncture and containing oil; substantially as described.

LUKE HARGREAVES.
WILLIAM STUBBS.

Witnesses:
W. B. JOHNSON,
WM. OWEN.